US012783848B2

(12) United States Patent
Tan et al.

(10) Patent No.: US 12,783,848 B2
(45) Date of Patent: Nov. 3, 2026

(54) METHOD FOR IMPROVING CONVOLUTIONAL NEURAL NETWORK TO PERFORM COMPUTATIONS

(71) Applicant: REALTEK SEMICONDUCTOR CORP., Hsinchu (TW)

(72) Inventors: Li-Li Tan, Suzhou (CN); Wen-Tsai Liao, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 1081 days.

(21) Appl. No.: 17/514,277

(22) Filed: Oct. 29, 2021

(65) Prior Publication Data

US 2022/0398429 A1 Dec. 15, 2022

(30) Foreign Application Priority Data

Jun. 15, 2021 (CN) ......................... 202110662142.4

(51) Int. Cl.
*G06N 3/04* (2023.01)

(52) U.S. Cl.
CPC ...................................... *G06N 3/04* (2013.01)

(58) Field of Classification Search
CPC ........ G06N 3/04; G06N 3/0464; G06N 3/063; G06F 17/153
See application file for complete search history.

(56) References Cited

U.S. PATENT DOCUMENTS 11,429,836 B2 * 8/2022 Huang .................. G06F 17/153
2018/0341495 A1 * 11/2018 Culurciello ............ G06N 3/063
2019/0130265 A1 * 5/2019 Ling ...................... G06N 3/063
2019/0279083 A1 * 9/2019 Gold ..................... G06F 7/5443
2019/0286980 A1 * 9/2019 Backhus ................ G06N 20/10
2020/0050555 A1 * 2/2020 Kim ...................... G06N 20/10
2021/0074036 A1 * 3/2021 Fuchs .................... A61B 6/032
2021/0232897 A1 * 7/2021 Bichler .................. G06N 3/049
2021/0256359 A1 * 8/2021 Chang .................... G06N 3/045
2021/0287092 A1 * 9/2021 Nie ................... G06F 18/24133
2021/0350214 A1 * 11/2021 Li ........................... H03M 7/70
2022/0004840 A1 * 1/2022 Mei ......................... G06F 17/16

FOREIGN PATENT DOCUMENTS

CN 107909148 B 10/2020

* cited by examiner

*Primary Examiner* — Mariela Reyes
*Assistant Examiner* — Evel Honore
(74) *Attorney, Agent, or Firm* — Li & Cai Intellectual Property (USA) Office

(57) ABSTRACT

A method for improving a convolutional neural network (CNN) to perform computations is provided. The method includes the following steps: determining a number of a plurality of multipliers to be N and a number of a plurality of adders to be N according to a number of convolution kernels used by a plurality of convolution layers; and in response to an i-th convolutional layer of the convolutional neural network performing a convolution operation and N convolution kernels of the i-th convolutional layer being all in a size of K×1×1, using the N multipliers and the N adders to perform a multiplication operation once and an addition operation once for each of the N convolution kernels of the i-th convolutional layer in one cycle, such that N outputs of the N convolution kernels of the i-th convolutional layer are obtained after K cycles.

3 Claims, 5 Drawing Sheets

METHOD FOR IMPROVING CONVOLUTIONAL NEURAL NETWORK TO PERFORM COMPUTATIONS

CROSS-REFERENCE TO RELATED PATENT APPLICATION

This application claims the benefit of priority to China Patent Application No. 202110662142.4, filed on Jun. 15, 2021 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a convolutional neural network (CNN), and more particularly to a method for improving a CNN to perform computations.

BACKGROUND OF THE DISCLOSURE

A convolutional neural network (CNN) has excellent performance in language recognition, and mel-frequency cepstral coefficients (MFCC) have been widely used as input data for the CNN to perform speech recognition. However, implementation of the CNN requires more storage resources and computing resources, and convolution kernels (also referred to as filters) of each convolution layer may have different sizes. For example, the CNN that processes the MFCC includes four convolutional layers, and each convolutional layer uses 16 convolution kernels. However, the convolution kernels of a first convolutional layer all have a size of 10×1×1, the convolution kernels of a second convolutional layer all have a size of 10×1×16, and the convolution kernels of a third and a fourth convolutional layer all have a size of 6×1×16 such that complicated storage control and intermediate buffering mechanisms are required. Therefore, an area and power consumption used for such implementation can be relatively large.

SUMMARY OF THE DISCLOSURE

In response to the above-referenced technical inadequacies, the present disclosure provides a method for improving a CNN to perform computations. The convolutional neural network includes a plurality of convolutional layers, and each of the plurality of convolutional layers uses N convolution kernels, where N is an integer greater than 1 The method includes the following steps: determining a number of a plurality of multipliers to be N and a number of a plurality of adders to be N according to a number of the convolution kernels used by the plurality of convolution layers; and in response to an i-th convolutional layer of the convolutional neural network performing a convolution operation and the N convolution kernels of the i-th convolutional layer being all in a size of K×1×1, using the N multipliers and the N adders to perform a multiplication operation once and an addition operation once for each of the N convolution kernels of the i-th convolutional layer in one cycle, such that N outputs of the N convolution kernels of the i-th convolutional layer are obtained after K cycles, in which i is an integer greater than or equal to 1, and K is an integer greater than 1.

Preferably, the method further includes: in response to a j-th convolutional layer of the convolutional neural network performing the convolution operation and the N convolution kernels of the j-th convolutional layer being all in a size of P×1×N, using the N multipliers and the N adders to perform N multiplication operations and N addition operations for a target convolution kernel of the N convolution kernels of the j-th convolutional layer in one cycle, such that an output of the target convolution kernel is obtained after P cycles, where j is an integer greater than or equal to 1, and P is an integer greater than 1.

Preferably, the CNN further includes a plurality of fully connected layers, and the method further includes: in response to a k-th fully connected layer of the convolutional neural network performing an operation and a total number of records of input data of the k-th fully connected layer being M*N, using the N multipliers and the N adders to complete conversion operations of N records of the input data in one cycle, such that an output of the k-th fully connected layer is obtained after M cycles, where k and M are integers greater than or equal to 1.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
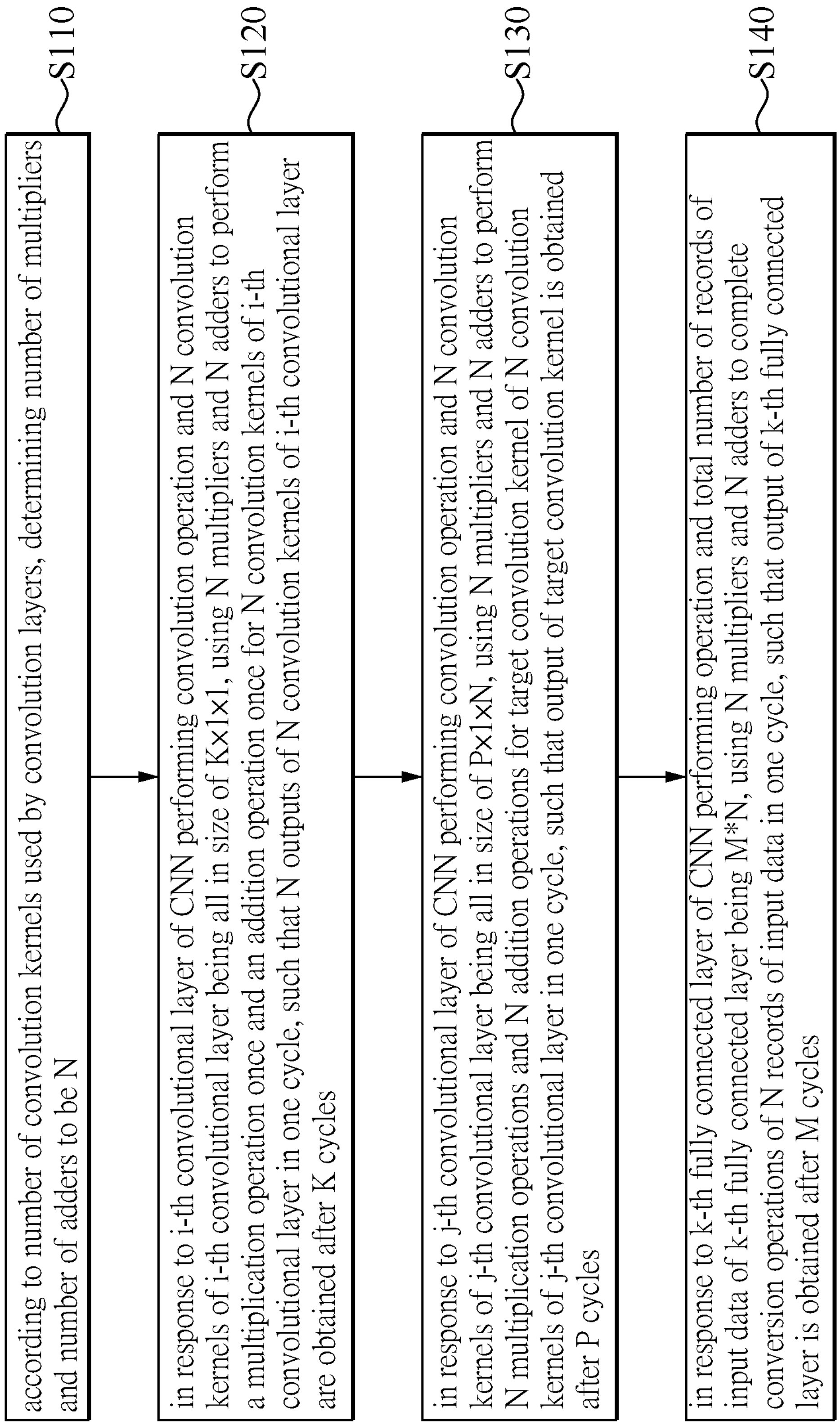
FIG. 1 is a flow chart of a method for improving a convolutional neural network (CNN) to enable usage of different sized convolution kernels in different convolution layers according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

Figure 2:
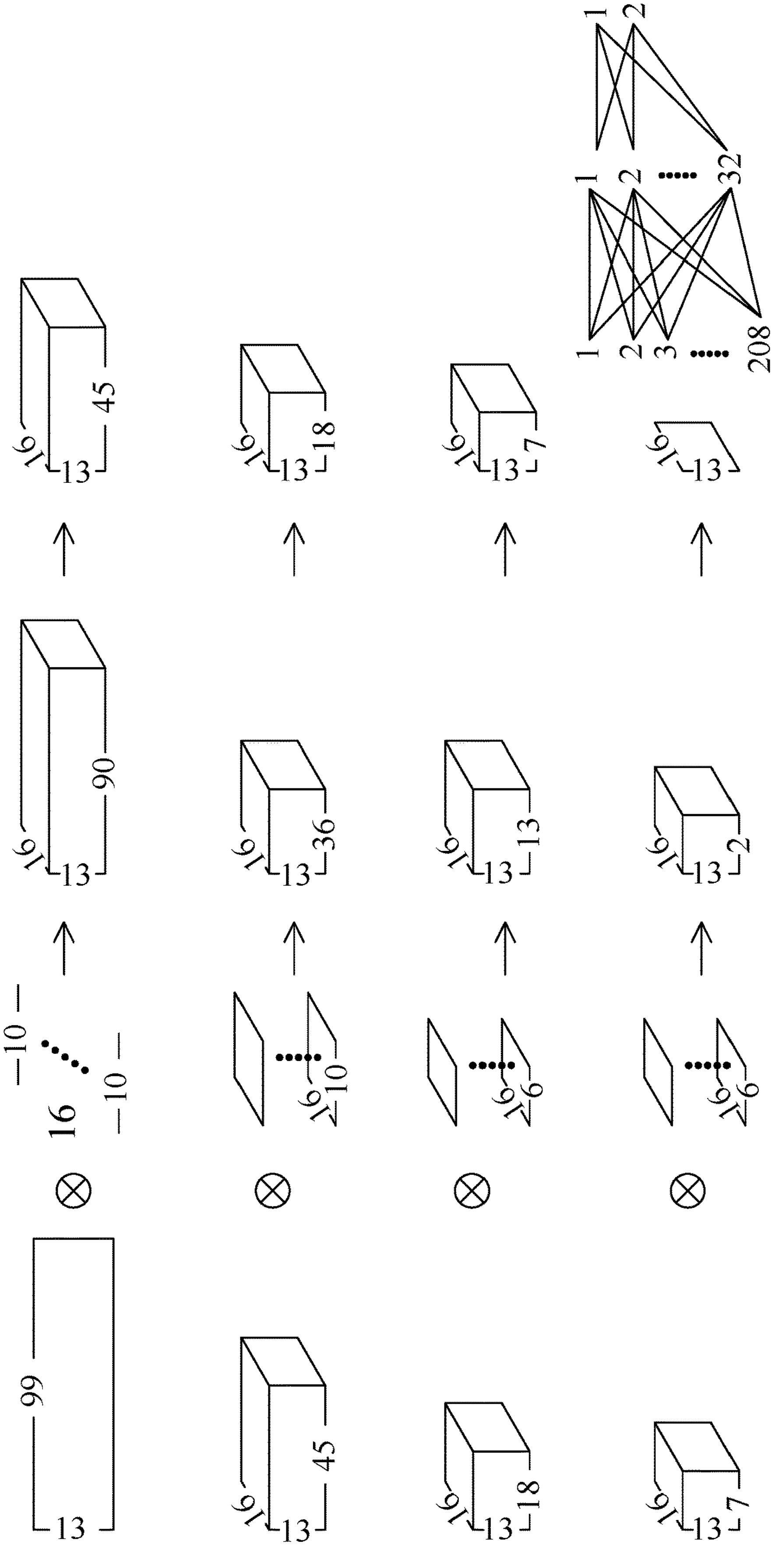
FIG. 2 is a schematic diagram of the CNN processing MFCC according to one embodiment of the present disclosure.

Referring to FIG. 1 and FIG. 2, FIG. 1 is a flow chart of a method for improving a convolutional neural network (CNN) to enable usage of different size convolution kernels in different convolution layers according to one embodiment of the present disclosure, and FIG. 2 is a schematic diagram showing the CNN processing MFCC according to one embodiment of the present disclosure. As mentioned above, the CNN includes a plurality of convolutional layers, and each convolutional layer can use N convolution kernels, where N is an integer greater than 1. For the convenience of the following description, the CNN of FIG. 2 that processes the MFCC is exemplified to include four convolutional layers in the present embodiment, and each convolutional layer uses 16 convolution kernels. However, the present disclosure does not limit input data of the CNN to be the MFCC, nor does the present disclosure limit a number of the convolutional layers included in the CNN and a number of the convolution kernels used in these convolutional layers. In general, the MFCC can be a parameter matrix with a size of 1×13×1, and 99 parameter matrices will be input to the CNN. That is, the input data in FIG. 2 can be a matrix with a size of 99×13×1, but the present disclosure is not limited thereto.

Since the convolution kernels of a first convolutional layer are all in a size of 10×1×1, the first convolutional layer of the conventional CNN completes one convolution operation by performing multiplication operations for 10 times and addition operations for 9 times on 10 elements of the input data and one of convolution kernels of the first convolutional layer, so as to obtain an output. In addition, since the convolution kernels of a second convolutional layer are all in a size of 10×1×16, the second convolutional layer of the existing CNN completes one convolution operation by performing the multiplication operations for 160 times and the addition operations for 159 times on 10*16 elements of the input data and one of the convolution kernels of the second convolutional layer, so as to obtain an output. Similarly, since the convolution kernels of a third and a fourth convolutional layer are all in a size of 6×1×16, in the existing CNN, the 3rd convolutional layer completes one convolution operation by performing the multiplication operations for 96 times and the addition operations for 95 times on 6*16 elements and one of the convolution kernels of the 3rd convolutional layer, and the 4th convolutional layer completes one convolution operation by performing the multiplication operations for 96 times and the addition operations for 95 times on 6*16 elements and one of the convolution kernels of the 4th convolutional layer, so as to obtain an output.

It can be observed that the existing CNN requires 10 multipliers for the first convolutional layer, 160 multipliers for the second convolutional layer, and 96 multipliers for each of the third and the fourth convolutional layer. Therefore, integration of circuits is difficult to achieve. In addition, each convolutional layer needs independent control and access circuits. Especially for data storage, a number of the elements that need to be read for each operation is different, such that storage control and intermediate buffering mechanisms are complicated. In response to the above-referenced technical inadequacies, in step S110 of FIG. 1, according to the number of convolution kernels used by the convolution layers, a number of the multipliers and a number of adders are determined to be N in this embodiment of the present disclosure. Next, in step S120, when an i-th convolutional layer of the convolutional neural network performs the convolution operation and the N convolution kernels of the i-th convolutional layer are all in a size of K×1×1, the N multipliers and the N adders are used to perform the multiplication operation once and the addition operation once for the N convolution kernels of the i-th convolutional layer in one cycle in the embodiment of the present disclosure, such that N outputs of the N convolution kernels of the i-th convolutional layer are obtained after K cycles. Here, i is an integer greater than or equal to 1, and K is an integer greater than 1.

Figure 3A:
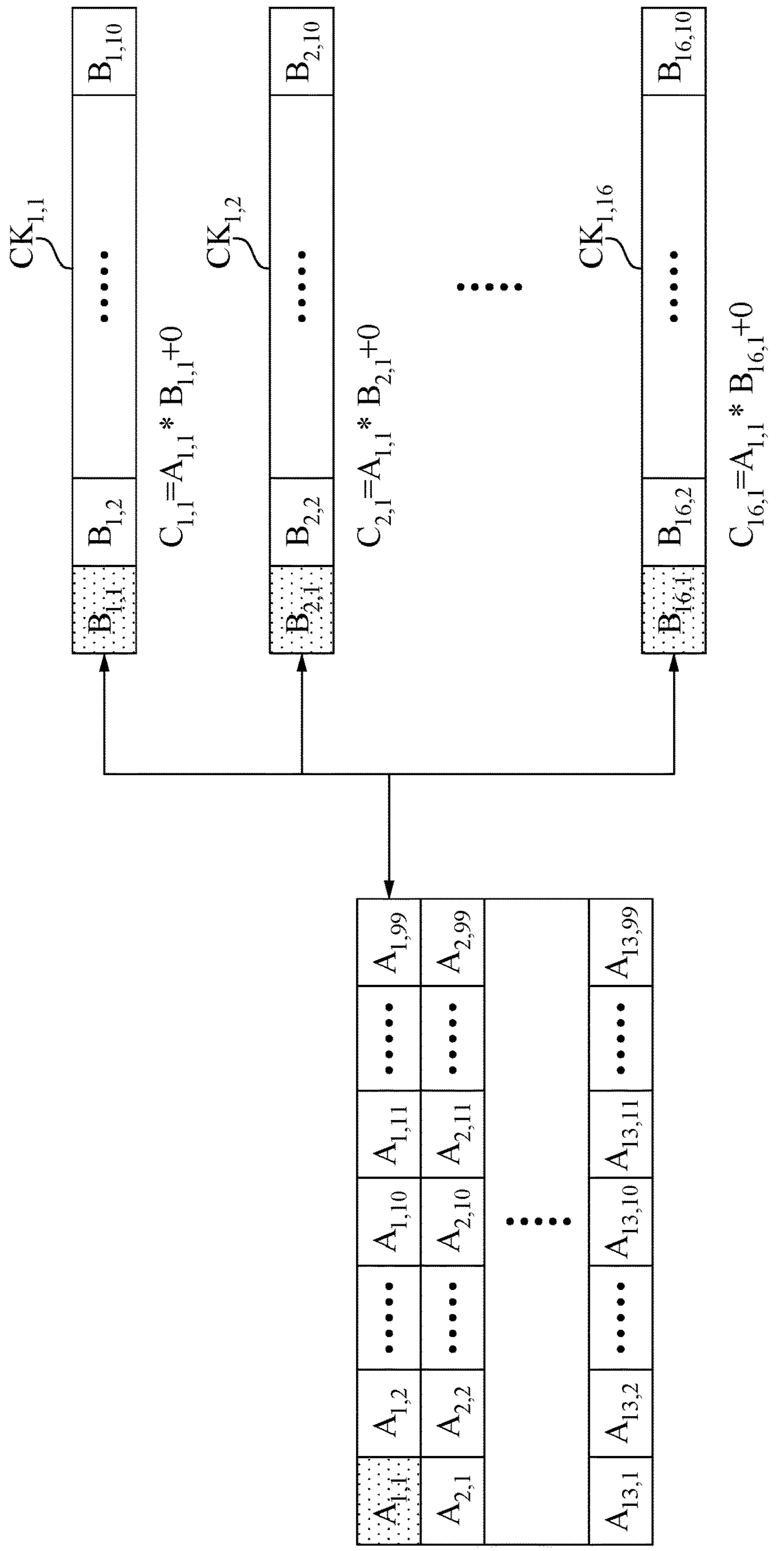
FIGS. 3A to 3C are schematic diagrams of the method in FIG. 1 being applied to a first convolutional layer in FIG. 2.
Figure 3B:
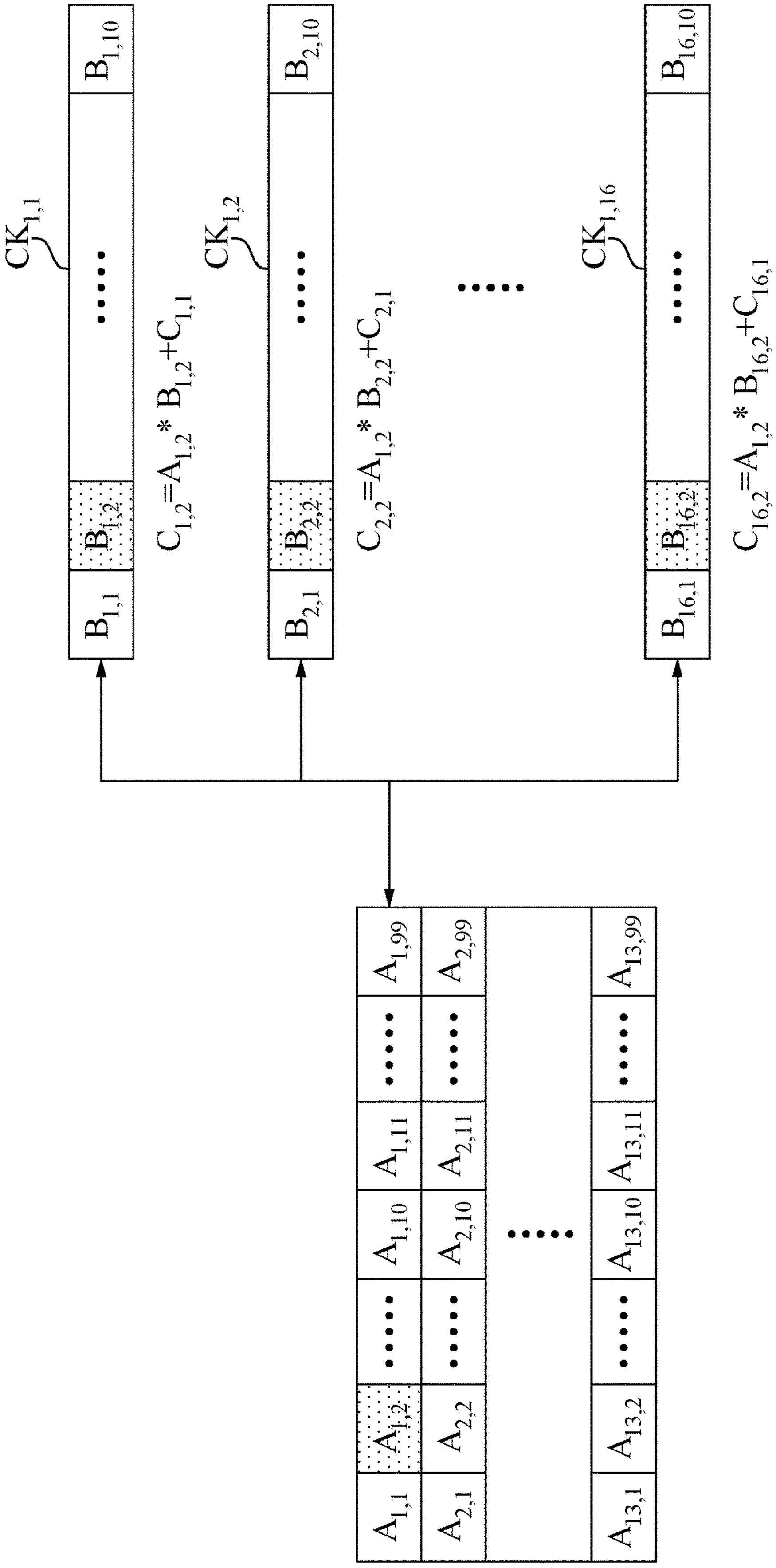
Figure 3C:
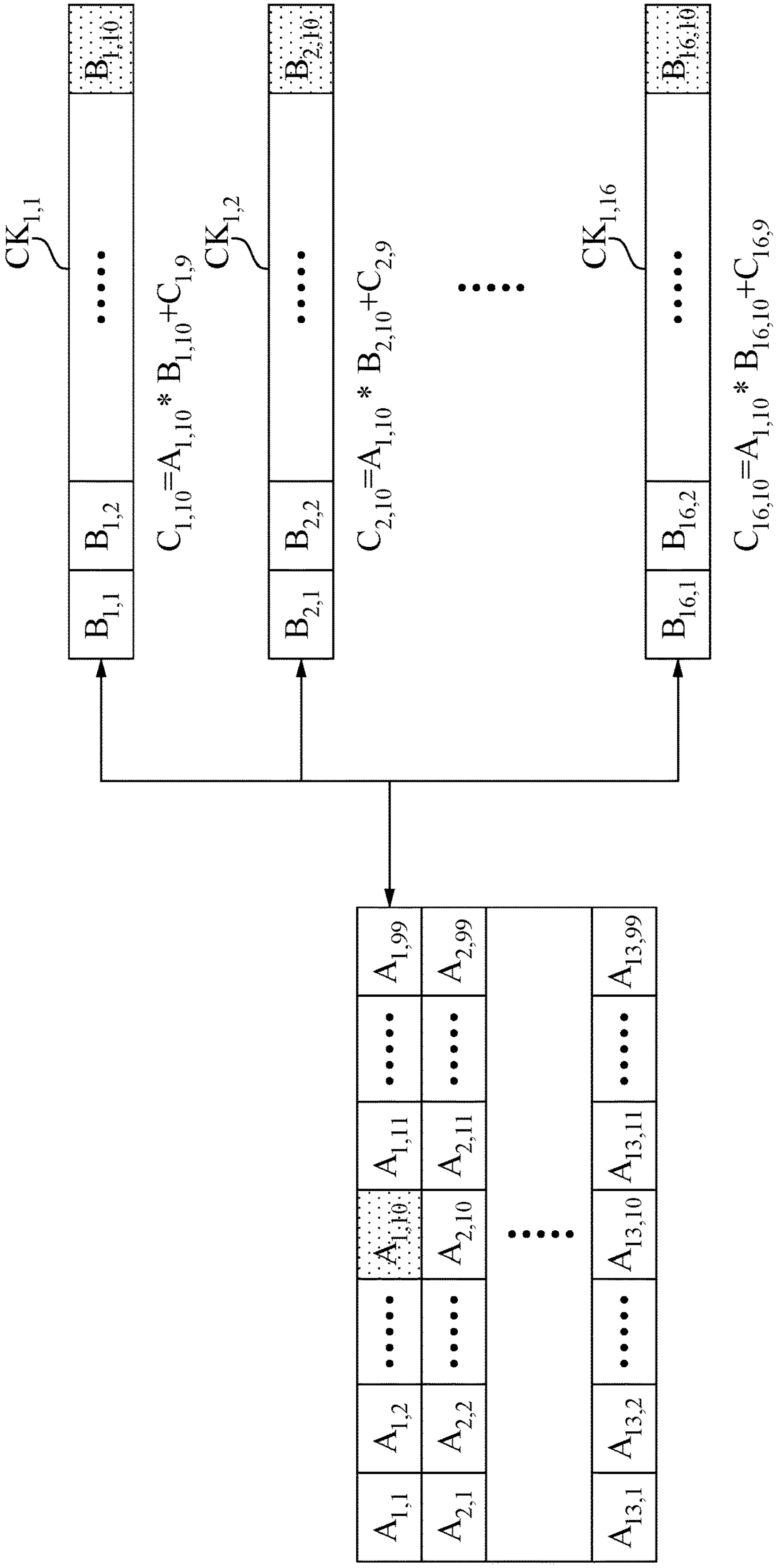

In other words, i, N, and K can respectively be 1, 16 and 10 in this embodiment, but the present disclosure is not limited thereto. Therefore, the first convolutional layer of FIG. 2 of the present disclosure performs the multiplication operation once and the addition operation once on one element and each convolution kernel of the first convolution layer. Reference can be made to FIGS. 3A to 3C, which are schematic diagrams showing that the method in FIG. 1 is applied to a first convolutional layer in FIG. 2. As shown in FIG. 3A, in a first cycle of the present disclosure, an element $A_{1,1}$ of the input data is multiplied with an element $B_{1,1}$ of a first convolution kernel $CK_{1,1}$ of the first convolution layer, and is then added with an operation result of a previous stage to obtain an operation result $C_{1,1}$ of this stage. The element $A_{1,1}$ of the input data is also multiplied with an element $B_{2,1}$ of a second convolution kernel $CK_{1,2}$ of the first convolution layer, and is then added with the operation result of the previous stage to get an operation result $C_{2,1}$ of this stage, and so forth. In this embodiment of the present disclosure, the element $A_{1,1}$ is multiplied with an element B16,1 of a sixteenth convolution kernel $CK_{1,16}$ of the first convolution layer, and is then added with the operation result of the previous stage to obtain an operation result C16,1 of this stage. Since there is no operation result of the previous stage at this time, in this embodiment of the present disclosure, the element $A_{1,1}$ and the elements $B_{1,1}$ to B16,1 are multiplied correspondingly, and then added correspondingly with 0 to obtain the operation results $C_{1,1}$ to C16,1.

Similarly, as shown in FIG. 3B, in a second cycle of the present disclosure, an element $A_{1,2}$ of the input data is multiplied with an element $B_{1,2}$ of the first convolution kernel $CK_{1,1}$ of the first convolution layer, and is then added with the operation result $C_{1,1}$ of a previous stage to get an operation result $C_{1,2}$ of this stage. The element $A_{1,2}$ of the input data is also multiplied with an element $B_{2,2}$ of the second convolution kernel $CK_{1,2}$ of the first convolution layer, and is then added with the operation result $C_{2,1}$ of the previous stage to get an operation result $C_{2,2}$ of this stage, and so forth. In this embodiment of the present disclosure, the element $A_{1,2}$ is also multiplied with an element B16,2 of the sixteenth convolution kernel $CK_{1,16}$ of the first convolution layer, and is then added with the operation result C16,1 of the previous stage to obtain an operation result C16,1 of this stage. Therefore, as shown in FIG. 3C, in a tenth cycle of the present disclosure, an operation result Cr,10 can be obtained, which is equal to:

$$A_{1,1}*B_{r,1}+A_{1,2}*B_{r,2}+A_{1,3}*B_{r,3}+A_{1,4}*B_{r,4}+A_{1,5}*B_{r,5}+A_{1,6}*B_{r,6}+A_{1,7}*B_{r,7}+A_{1,8}*B_{r,8}+A_{1,9}*B_{r,9}+A_{1,10}*B_{r,10};$$

where r is an integer from 1 to 16. That is, outputs of 16 convolution kernels can be obtained at the same time.

Taking FIG. 2 as an example, it can be observed that 16 multipliers and 16 adders are utilized in the present disclosure to perform the multiplication operation once and the addition operation once for each of the 16 convolution kernels of the first convolution layer in one cycle, such that the 16 outputs of the 16 convolution kernels of the first convolution layer are obtained after 10 cycles. Therefore, storage control is no longer complicated, and only one independent region for storage is needed for intermediate buffering. In addition, in step S130 of FIG. 1 of the present disclosure, when a j-th convolutional layer of the convolutional neural network performs a convolution operation and the N convolution kernels of the j-th convolutional layer are all in a size of P×1×N, the N multipliers and the N adders are used to perform N multiplication operations and N addition operations for a target convolution kernel of the N convolution kernels of the j-th convolutional layer in one cycle, such that an output of the target convolution kernel is obtained after P cycles. Here, j is an integer greater than or equal to 1, and P is an integer greater than 1.

In other words, j and P can respectively be 2 and 10 in this embodiment, but the present disclosure is not limited thereto. Therefore, the second convolutional layer of FIG. 2 of the present disclosure performs the multiplication operations for 16 times and the addition operations for 16 times on 16 elements and one of the convolution kernels (i.e., the target convolution kernel) of the second convolution layer, such that an output of the target convolution kernel is obtained after 10 cycles. Similarly, j and P can respectively be 3 and 6 in this embodiment. Therefore, the third convolutional layer of FIG. 2 of the present disclosure performs the multiplication operations for 16 times and the addition operations for 16 times on 16 elements and one of the convolution kernels (i.e., the target convolution kernel) of the third convolution layer, such that an output of the target convolution kernel is obtained after 6 cycles. Alternatively, j and P can respectively be 4 and 6 in this embodiment. Therefore, the fourth convolutional layer of FIG. 2 of the present disclosure performs the multiplication operations for 16 times and the addition operations for 16 times on 16 elements and one of the convolution kernels (i.e., the target convolution kernel) of the fourth convolution layer, such that an output of the target convolution kernel is obtained after 6 cycles.

It should be understood that the present disclosure does not limit an execution order and execution times of step S120 and step S130. In addition, the CNN can also include a plurality of fully connected layers for classification. However, since an operating principle of the fully connected layer is already known to those skilled in the art, the details thereof are omitted herein. In short, in step S140 of FIG. 1 of the present disclosure, when a k-th fully connected layer of the CNN performs an operation and a total number of records of input data of the k-th fully connected layer is M*N, the N multipliers and the N adders are used to complete conversion operations of N records of the input data in one cycle, such that an output of the k-th fully connected layer is obtained after M cycles. Here, k and M are integers greater than or equal to 1.

As shown in FIG. 2, k and M can be 1 and 13, respectively. Therefore, when a first fully connected layer of FIG. 2 performs the operation, these 16 multipliers and 16 adders are used to complete the conversion operations of 16 records of input data in one cycle, such that an output of the first fully connected layer is obtained after 13 cycles. Similarly, k and M can both be 2. Therefore, when a second fully connected layer of FIG. 2 performs the operation, these 16 multipliers and 16 adders are used to complete the conversion operations of 16 records of input data in one cycle, such that an output of the second fully connected layer is obtained after 2 cycles.

In conclusion, compared with the existing CNN, the present disclosure provides a method for improving a CNN to perform computations, such that complicated storage control and intermediate buffering mechanisms are not required, and an area and power consumption used for such implementation are relatively small.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for improving a convolutional neural network to perform computations, the convolutional neural network including a plurality of convolutional layers, each of the plurality of convolutional layers using N convolution kernels, and the method comprising processes of:

configuring a circuit that comprises N multiplier circuits and N adder circuits, wherein the number N of the multiplier circuits is equal to a number of the N convolution kernels used by the plurality of convolution layers; and in response to an i-th convolutional layer of the convolutional neural network performing a convolution operation and the N convolution kernels of the i-th convolutional layer all having a size of K×1×1, performing a multiplication operation by the N multiplier circuits and the N adder circuits once and an addition operation once for each of the N convolution kernels of the i-th convolutional layer in one of K cycles, such that N operation results of the N convolution kernels of the i-th convolutional layer are obtained after the K cycles, wherein Nis an integer greater than 1, i is an integer greater than or equal to 1, and K is an integer greater than 1;

storing, by a storage coupled to the N multiplier circuits and the N adder circuits, data of the N convolution kernels and the N operation results of the N convolution kernels after K cycles;

wherein the process of performing the multiplication operation once and the addition operation once for each of the N convolution kernels of the i-th convolutional layer in one of the K cycles by the N multiplier circuits and the N adder circuits includes:

in a first one of the K cycles, by the N multiplier circuits, multiplying a first one of a plurality of elements of input data with a first one of a plurality of elements of each of the N convolution kernels of the i-th convolution layer, to obtain N operation results respectively of the N convolution kernels;

in a K-th of the K cycles except for the first one of the K-th cycles, multiplying an N-th of the plurality of elements of the input data with an N-th of the plurality of elements of each of the N convolution kernels of the i-th convolution layer to obtain N values respectively of the N convolution kernels by the N-multiplier circuits, and then adding an N-th of the N values with the operation result of the N-th of the N values obtained in an (K−1)th of the K cycles by the N adder circuits, to obtain the operation results of respectively of the N convolution kernels; and wherein, in each one of the K cycles, one of the plurality of elements of the input data is received by the N multiplier circuits, and the data of the N convolution kernels are received by the N multiplier circuits, respectively, and a product of the multiplication operation generated by each of the N multiplier circuits is received by the corresponding N adder circuits.

2. The method according to claim 1, further comprising:

in response to a j-th convolutional layer of the convolutional neural network performing the convolution operation and the N convolution kernels of the j-th convolutional layer all having a size of P×1×N, by the N multiplier circuits and the N adder circuits, performing N multiplication operations and N addition operations for a target convolution kernel of the N convolution kernels of the j-th convolutional layer in one cycle, such that an output of the target convolution kernel is obtained after P cycles, wherein j is an integer greater than or equal to 1, and P is an integer greater than 1.

3. The method according to claim 2, wherein the convolutional neural network further includes a plurality of fully connected layers, and the method further comprises:

in response to a k-th fully connected layer of the convolutional neural network performing an operation and a total number of records of input data of the k-th fully connected layer being M*N, by the N multiplier circuits and the N adder circuits, completing conversion operations of N records of the input data in one cycle, such that an output of the k-th fully connected layer is obtained after M cycles, wherein k and M are integers greater than or equal to 1.

* * * * *